United States Patent
Reddy et al.

(10) Patent No.: US 12,556,591 B2
(45) Date of Patent: Feb. 17, 2026

(54) EXTENDING COMMUNICATION SERVICES TO A CONSUMPTION DEVICE USING A PROXY DEVICE

(71) Applicant: RELIANCE JIO INFOCOMM USA, INC., Frisco, TX (US)

(72) Inventors: Gautam G. Reddy, Plano, TX (US); Pallavur A. Sankaranaraynan, Frisco, TX (US); Jayabharath R. Goluguri, McKinney, TX (US); Mathew Oommen, Frisco, TX (US)

(73) Assignee: RELIANCE JIO INFOCOMM USA, INC., Frisco, TX (US)

( * ) Notice: Subject to any disclaimer, the term of this patent is extended or adjusted under 35 U.S.C. 154(b) by 0 days.

(21) Appl. No.: 18/458,352

(22) Filed: Aug. 30, 2023

(65) Prior Publication Data
US 2023/0412651 A1    Dec. 21, 2023

Related U.S. Application Data

(63) Continuation of application No. 17/107,063, filed on Nov. 30, 2020, now Pat. No. 11,785,055, which is a continuation of application No. 15/888,699, filed on Feb. 5, 2018, now Pat. No. 10,855,729, which is a continuation of application No. 14/855,265, filed on Sep. 15, 2015, now Pat. No. 9,888,044.

(60) Provisional application No. 62/050,516, filed on Sep. 15, 2014.

(51) Int. Cl.
| | | |
|---|---|---|
| H04L 65/10 | (2022.01) | |
| H04L 65/1059 | (2022.01) | |
| H04L 65/1069 | (2022.01) | |
| H04W 68/00 | (2009.01) | |
| H04W 72/0453 | (2023.01) | |
| H04W 76/10 | (2018.01) | |

(52) U.S. Cl.
CPC ...... *H04L 65/1069* (2013.01); *H04L 65/1059* (2013.01); *H04W 68/005* (2013.01); *H04W 72/0453* (2013.01); *H04W 76/10* (2018.02)

(58) Field of Classification Search
CPC .......... H04L 65/1069; H04L 65/1059; H04W 68/005; H04W 72/0453; H04W 76/10
See application file for complete search history.

(56) References Cited

U.S. PATENT DOCUMENTS

| | | | |
|---|---|---|---|
| 8,543,665 B2 | 9/2013 | Ansari et al. | |
| 8,650,290 B2 | 2/2014 | Dare et al. | |
| 8,745,213 B2 | 6/2014 | Dare et al. | |
| 8,767,555 B1 * | 7/2014 | Xue ...................... | H04W 40/02 370/238 |
| 8,856,322 B2 | 10/2014 | Dare et al. | |

(Continued)

*Primary Examiner* — Steven Hieu D Nguyen
(74) *Attorney, Agent, or Firm* — Jackson Walker LLP; Christopher J. Rourk

(57) ABSTRACT

A system for data communications comprising a handset having a processor, a wireless communications device, a speaker and a microphone and one or more software applications operating on the processor that are configured to interface with a voice over long-term evolution (VoLTE) service. A wireless access point coupled to the handset through a local wireless communications media and the wireless communications device, the wireless access point further coupled to a long range wireless communications media and configured to interface with a server that provides VoLTE calling functionality.

20 Claims, 2 Drawing Sheets

(56) References Cited

U.S. PATENT DOCUMENTS

| | | |
|---|---|---|
| 9,305,163 B2 | 4/2016 | Murphy |
| 9,306,933 B2 | 4/2016 | Pontillo et al. |
| 9,674,173 B2 | 6/2017 | Fox |
| 9,940,454 B2 | 4/2018 | Richardson et al. |
| 2004/0160947 A1* | 8/2004 | Hardy ................. H04L 65/1026 370/352 |
| 2005/0190747 A1* | 9/2005 | Sindhwani ............ H04W 88/06 370/254 |
| 2012/0172011 A1* | 7/2012 | Gupta ................... H04W 68/02 455/414.1 |
| 2012/0201239 A1* | 8/2012 | Stevens ................... H04M 9/00 370/352 |
| 2014/0106709 A1* | 4/2014 | Palamara .......... H04W 72/0453 455/411 |
| 2015/0358790 A1* | 12/2015 | Nasserbakht ........... G06F 21/32 726/19 |
| 2018/0352013 A1* | 12/2018 | Badar ................. H04L 65/1063 |

* cited by examiner

EXTENDING COMMUNICATION SERVICES TO A CONSUMPTION DEVICE USING A PROXY DEVICE

RELATED APPLICATIONS

The present application is a continuation of U.S. patent application Ser. No. 17/107,063 filed Nov. 30, 2020, which is a continuation of U.S. patent application Ser. No. 15/888,699 filed Feb. 5, 2018, which issued on Dec. 1, 2020 as U.S. Pat. No. 10,855,729, which is a continuation of U.S. patent application Ser. No. 14/855,265 filed Sep. 15, 2015, which issued on Feb. 6, 2018 as U.S. Pat. No. 9,888,044, which claims priority to U.S. Provisional Patent Application No. 62/050,516, filed Sep. 15, 2014, each of which is hereby incorporated by reference for all purposes as if set forth herein in its entirety.

TECHNICAL FIELD

The present disclosure relates generally to data communications, and more specifically to extending communication services to a consumption device using a proxy device.

BACKGROUND OF THE INVENTION

Data communications includes the use of packet switched networks to support voice communications, but due to regulatory requirements, certain classes of devices may be incapable of using different types of communications protocols.

SUMMARY OF THE INVENTION

A system for data communications comprising a handset having a processor, a wireless communications device, a speaker and a microphone and one or more software applications operating on the processor that are configured to interface with a voice over long-term evolution (VoLTE) service. A wireless access point coupled to the handset through a local wireless communications media and the wireless communications device, the wireless access point further coupled to a long range wireless communications media and configured to interface with a server that provides VoLTE calling functionality.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
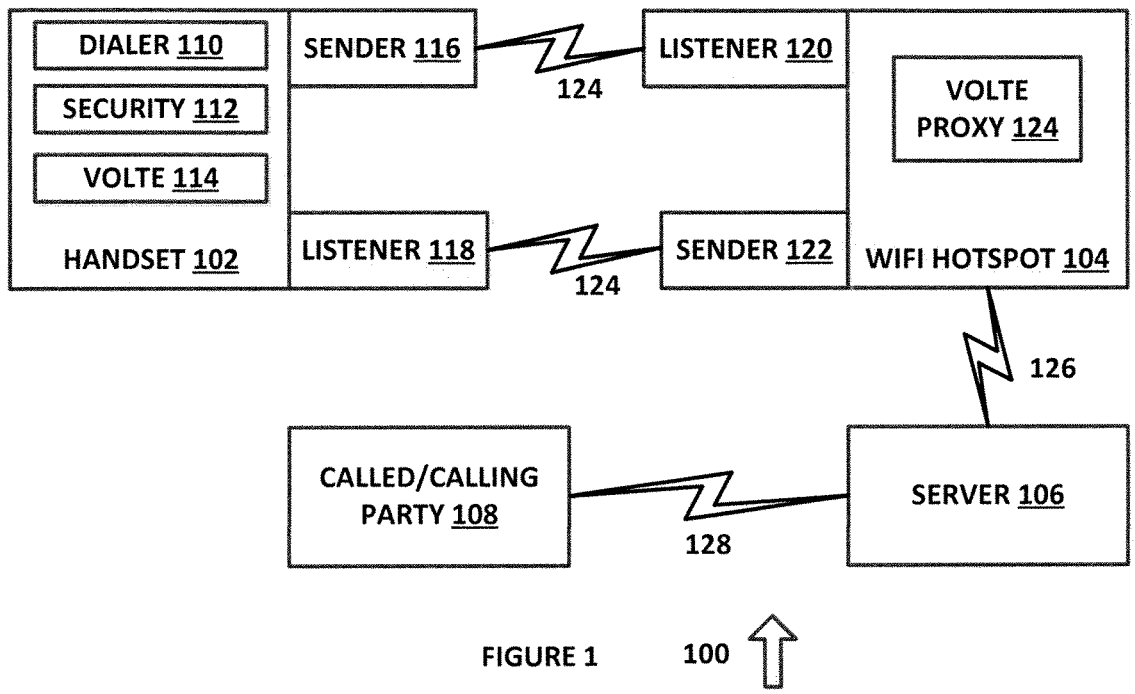
FIG. 1 is a diagram of a system for extending communication services to a consumption device using a proxy device, in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a system 100 for extending communication services to a consumption device using a proxy device, in accordance with an exemplary embodiment of the present disclosure. System 100 can be implemented in hardware or a suitable combination of hardware and software, and can be one or more software systems operating on one or more processors.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

System 100 includes handset 102, which communicates with WiFi hotspot 104 over communications media 124. In one exemplary embodiment, handset 102 can have an associated sender 116 and listener 118 that communicate with a corresponding listener 120 and sender 122 of WiFi hotspot 104. Handset 102 also includes dialer 110, security 112 and VoLTE 114. Dialer 110 can be an application operating on handset 102 or other suitable hardware or software that is configured to generate a digit stream for dialing an outgoing number. In one exemplary embodiment, dialer 110 can be implemented using one or more objects, each having graphic, functional and text attributes that generate a plurality of user-selectable keypad controls that allow a user to enter a telephone number or other suitable numbers.

Security 112 can be an application operating on handset 102 or other suitable hardware or software that is configured to control access to WiFi hotspot 104. In one exemplary embodiment, security 112 can be implemented using one or more objects, each having graphic, functional and text attributes that generate a plurality of user-selectable keypad controls that prompts a user to enter a personal identification number or other suitable codes to prevent an unauthorized user from accessing the calling functionality of VoLTE proxy 124.

VoLTE 114 can be one or more software applications configured to provide voice over Long Term Evolution (VoLTE) communications, in accordance with the LTE standard for communication published by the $3^{rd}$ Generation Partnership Project. In one exemplary embodiment, a handset can be configured to communicate using voice over LTE in conjunction with VoLTE proxy 124 on WiFi hotspot 104. VoLTE proxy 124 can be one or more software applications that interface with one or more handsets 102, which can be smart phones, Bluetooth handsets or other suitable devices.

In operation, a user can place an outgoing call using handset 102 and WiFi hotspot 104, by dialing a telephone number using dialer 110 after accessing WiFi hotspot over communications media 124. Dialer 110 can be used to enter a PIN for security 112, and to transmit an outgoing number to set up a call to called/calling party 108. WiFi hotspot 104 and VoLTE proxy 124 then set up the call to called/calling party 108 using server 106 over communications media 126 and communications media 128, each of which can be a wireless communications medium, a wireline communications medium, other suitable communications media or a suitable combination of communications media. On one exemplary embodiment, communications media 126 can be a LTE long range wireless data network, and communications media 128 can be the public switched telephone network (PSTN), a private packet switched network or other suitable media or combinations of media.

Likewise, a user can receive an incoming call from called/calling party 108, who calls VoLTE proxy 124 over communications media 128 and communications media 126 using server 106. VoLTE proxy 124 can generate a ring signal on handset 102 and other suitable handsets, and can establish a voice channel with the first handset that answers using listener 120 and sender 122 or in other suitable manners.

Figure 2:
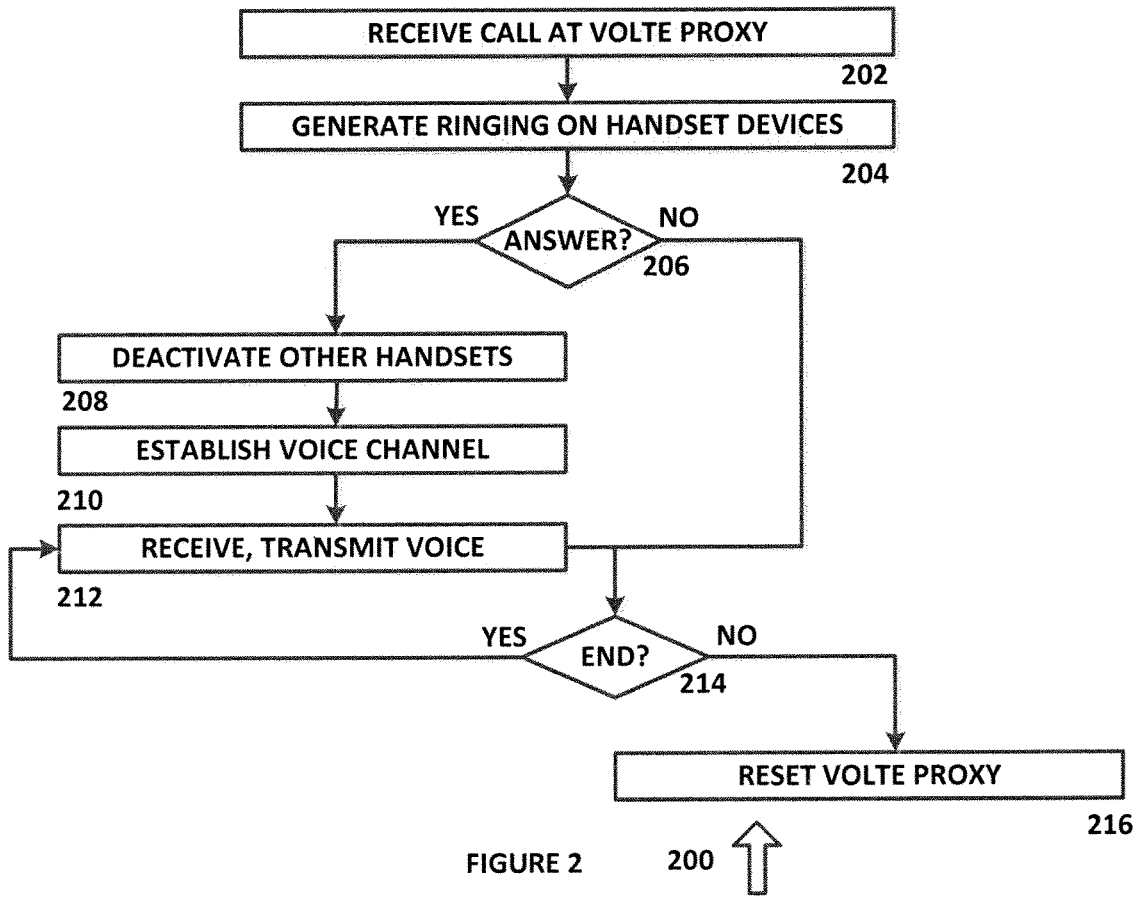
FIG. 2 is a diagram of an algorithm for receiving a call at a VoLTE-enabled device, in accordance with an exemplary embodiment of the present disclosure.

FIG. 2 is a diagram of an algorithm 200 for receiving a call at a VoLTE-enabled device, in accordance with an exemplary embodiment of the present disclosure. Algorithm 200 can be implemented in hardware or a suitable combination of hardware and software, and can be one or more software systems operating on one or more processors.

Algorithm 200 begins at 202, where a call is received on a VoLTE proxy operating on a WiFi hotspot. In one exemplary embodiment, the WiFi hotspot can have an associated telephone number that is registered with a server that provides VoLTE services, and a third party can call that number in order to set up a call with a user associated with the VoLTE proxy. When the calling party enters the telephone number of the VoLTE proxy, a server and other suitable communications devices set up a voice channel between the calling party and the VoLTE proxy using suitable algorithms. The algorithm then proceeds to 204.

At 204, the VoLTE proxy generates a ring tone on one or more handset devices. In one exemplary embodiment, each handset device can be registered with the VoLTE proxy over associated sender and listener ports, and the VoLTE proxy can send a ring command to a VoLTE system or algorithm operating on each handset, or other suitable algorithms can be used to generate the ring command. The algorithm then proceeds to 206.

At 206, it is determined whether a handset has answered the call. In one exemplary embodiment, a VoLTE application operating on the handset can generate an answer control, can receive an off hook control signal from a device, or can use other suitable algorithmic processes or devices to generate an off hook signal that is transmitted to the VoLTE proxy. If it is determined that no off hook signal or other suitable control data has been received at 206, such as by checking a predetermined register for a predetermined stored data value, the algorithm proceeds to 214. Otherwise, the algorithm proceeds to 208.

At 208, one or more other handsets are deactivated by the VoLTE proxy. In one exemplary embodiment, a predetermined data register can be set to a value that prevents the other handsets from establishing a connection with the VoLTE proxy while it is being used to support a telephone call. Likewise, other suitable processes or algorithms can also or alternatively be used. The algorithm then proceeds to 210.

At 210, the voice channel is established to the answering handset. In one exemplary embodiment, caches can be established to store voice data for transmission to the handset from the calling party, and to store voice data from the handset for transmission to the called party, or other suitable processes or algorithms can also or alternatively be used. The algorithm then proceeds to 212.

At 212, voice channel data is received and transmitted between the called and calling parties. In one exemplary embodiment, one or more software applications for providing VoLTE voice communications can be used to monitor buffered data and to transmit the buffered data at suitable times to support duplex voice communications over a packet switched network, to provide echo cancellation, to provide noise suppression and for other suitable purposes. The algorithm then proceeds to 214.

At 214, it is determined whether the call has ended. In one exemplary embodiment, an on hook signal can be generated when a calling party or the local handset terminates the call, an activity detector can determine that no activity has occurred for a predetermined period of time or other suitable processes can also or alternatively be used to determine whether the call has ended. If it is determined that the call has ended, the algorithm proceeds to 216, where the VoLTE proxy is reset to receive another incoming call or to set up an outgoing call from one of the handsets. Otherwise, the algorithm returns to 212.

In operation, algorithm 200 allows a VoLTE proxy to receive an incoming call and to generate a ring signal to allow a handset to answer the incoming call. The VoLTE proxy can service a number of different handsets, and can generate the same ringtone on each handset, or can generate different ring tones on different handsets, such as where the VoLTE proxy can receive calls for different telephone numbers. Although algorithm 300 is shown as a flow chart, algorithm 200 can also or alternatively be implemented using object oriented programming, state diagrams or other suitable programming paradigms.

Figure 3:
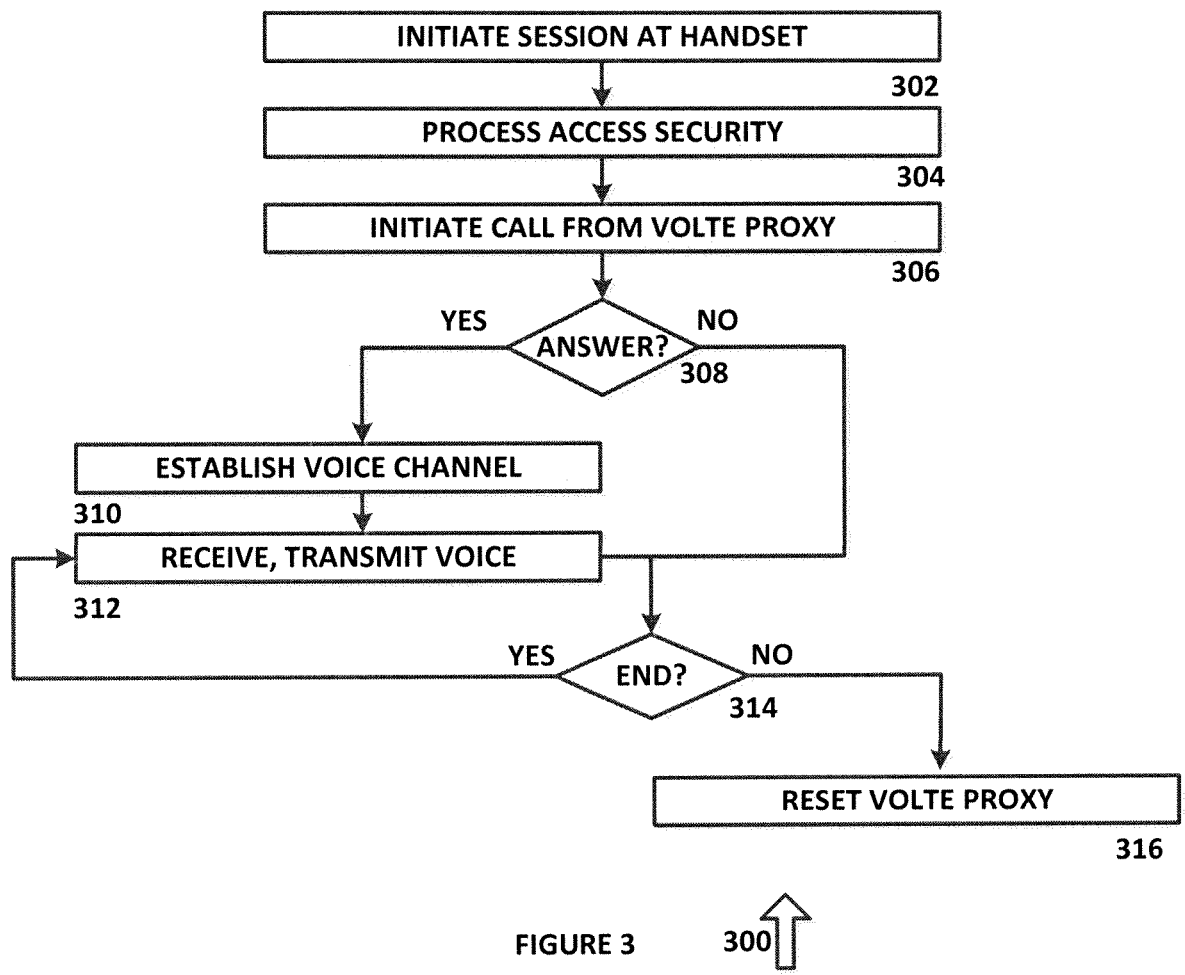
FIG. 3 is a diagram of an algorithm for setting up a call at a VoLTE-enabled device, in accordance with an exemplary embodiment of the present disclosure.

FIG. 3 is a diagram of an algorithm 300 for setting up a call at a VoLTE-enabled device, in accordance with an exemplary embodiment of the present disclosure. Algorithm 300 can be implemented in hardware or a suitable combination of hardware and software, and can be one or more software systems operating on one or more processors.

Algorithm 300 begins at 302, where a calling session is initiated at a handset. In one exemplary embodiment, the calling session can be initiated by activating an application that operates on the handset and which sets up a sender and listener on the handset and a corresponding listener and sender on a WiFi hotspot, by generating a dialer user interface on the handset or in other suitable manners. The algorithm then proceeds to 304.

At 304, access security is processed, such as by determining whether the handset has credentials to access the WiFi hotspot, by generating a user interface prompt to enter a PIN number or access code or in other suitable manners. In one exemplary embodiment, access security can be determined when the handset originally obtains access to the WiFi hotspot, prior to initiating the calling session or in other suitable manners. The algorithm then proceeds to 306.

At 306, a call is initiated from a VoLTE proxy operating on the WiFi hotspot. In one exemplary embodiment, the WiFi hotspot can include a processor and associated software applications that cause the processor to execute a series of instructions that receive a calling number from a handset, that set up a call with a called party using a VoLTE server or other suitable packet-switched voice communications protocols, that manage communications once the call is in progress and that perform other suitable functions. The VoLTE proxy can also or alternatively manage multiple calls from multiple handsets, such as by managing different telephone numbers for each handset or in other suitable manners. The algorithm then proceeds to 308.

At 308, it is determined whether the called party has answered the call, such as by monitoring the status of a data register that is updated when an off-hook signal is received from the called party or in other suitable manners. If it is determined that the called party has not answered the call after a predetermined number of rings, a predetermined period time or in other suitable manners, the algorithm proceeds to 314, otherwise the algorithm proceeds to 310 where a voice channel with the called party is established. The algorithm then proceeds to 312, where voice data is received and transmitted from the calling handset to the called party. In one exemplary embodiment, the VoLTE proxy operating on the WiFi hotspot can buffer data received from the handset and the called party and can manage the transmission and reception of data to process the data to reduce echo signals, to improve sound quality, to reduce noise, to avoid delays and for other suitable purposes. The algorithm then proceeds to 314.

At 314, it is determined whether the call has terminated. In one exemplary embodiment, the called party can send an on-hook signal or other suitable data that can be used to determine that the call has ended, an activity detector or other suitable systems can be used to determine if the called party has terminated the call or other suitable processes can also or alternatively be used. If it is determined that the call has not ended, the algorithm returns to 312, otherwise the algorithm proceeds to 316, where the VoLTE proxy is reset.

In operation, algorithm 300 allows a WiFi hotspot to operate a VoLTE proxy, to allow a handset that has access to WiFi to use the VoLTE services to place calls over a packet switched network. Although algorithm 300 is shown as a flow chart, algorithm 300 can also or alternatively be implemented using object oriented programming, state diagrams or other suitable programming paradigms.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method, comprising:
   at a server, receiving a set up message for originating a call from a first user equipment (UE), the first UE registered with the server, wherein the set up message is sent when the first UE initiates the call;
   creating a proxy and storing the proxy in association with the first UE at the server at a remote location and in response to the set up message;
   creating, at the server, an association between the proxy and a called party;
   deactivating a second UE associated with the proxy during the call;
   establishing the call;
   terminating the call upon receipt of a signal from the first UE; and
   reactivating the second UE after termination of the call.

2. The method of claim 1, further comprising associating the proxy with a call identifier.

3. The method of claim 1, wherein the proxy is a Voice over Long Term Evolution (VoLTE) proxy and the server is connected to an LTE long range wireless data network.

4. The method of claim 1, wherein the first UE has an identifier that is registered with the server and the second UE can receive a call over a second network.

5. The method of claim 1, wherein the first UE is registered with a sender port.

6. The method of claim 1, further comprising sending a port request for the first UE.

7. The method of claim 1 further comprising processing access security prior to establishing the call.

8. The method of claim 1, wherein a ring tone for the call is generated.

9. The method of claim 1, wherein the method uses Voice over Long Term Evolution (VoLTE) technology.

10. The method of claim 1, wherein the association between the proxy and a called party includes a telephone number.

11. A system, comprising:
    a server configured to receive a set up message for originating a call from a remote first user equipment (UE) registered with the server, wherein the set up message is sent when the first UE initiates the call;
    the server configured to create a proxy and to store the proxy in association with the first UE;
    the server configured to create an association between the proxy and a called party;
    the system configured to deactivate a second UE associated with the proxy during the call;
    the server configured to establish the call;
    the server configured to terminate the call upon receipt of a signal from the first UE; and
    the system configured to reactivate the second UE after termination of the call.

12. The system of claim 11, wherein the server is configured to associate the proxy with a call identifier over an LTE long range wireless data network.

13. The system of claim 11, wherein the proxy is a Voice over Long Term Evolution (VoLTE) proxy.

14. The system of claim 11, wherein the first UE has an identifier that is registered with the server and the second UE is associated with a second network.

15. The system of claim 11, wherein the first UE is registered with a sender port.

16. The system of claim 11, wherein the system is configured to send a port request for the first UE.

17. The system of claim 11 further comprising processing access security prior to establishing the call.

18. The system of claim 11, wherein a ring tone for the call is generated.

19. The system of claim 11, wherein the system uses Voice over Long Term Evolution (VoLTE) technology.

20. The system of claim 11, wherein the association between the proxy and a called party includes a telephone number.

\* \* \* \* \*